US012667913B2

(12) United States Patent
Flamm et al.

(10) Patent No.: US 12,667,913 B2
(45) Date of Patent: Jun. 30, 2026

(54) METHOD AND DEVICE FOR LASER PROCESSING A WORKPIECE

(71) Applicant: TRUMPF Laser GmbH, Schramberg (DE)

(72) Inventors: Daniel Flamm, Ludwigsburg (DE); Jonas Kleiner, Leonberg (DE); Myriam Kaiser, Heimsheim (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 19/204,659

(22) Filed: May 12, 2025

(65) Prior Publication Data

US 2025/0276405 A1 Sep. 4, 2025

Related U.S. Application Data

(63) Continuation of application No. PCT/EP2023/076954, filed on Sep. 28, 2023.

(30) Foreign Application Priority Data

Nov. 14, 2022 (DE) ..................... 10 2022 130 022.6

(51) Int. Cl.
  B23K 26/067 (2006.01)
  B23K 26/06 (2014.01)
(52) U.S. Cl.
  CPC ........ B23K 26/067 (2013.01); B23K 26/0665 (2013.01)
(58) Field of Classification Search
  CPC .......................... B23K 26/067; B23K 26/0665
  (Continued)

(56) References Cited

U.S. PATENT DOCUMENTS 10,620,444 B2 4/2020 Kumkar et al.
12,251,776 B2 3/2025 Flamm et al.
(Continued)

FOREIGN PATENT DOCUMENTS

DE 202010013161 U1 3/2011
DE 102014116958 A1 5/2016
(Continued)

OTHER PUBLICATIONS

Keyou Chen et al., "Generalized axicon-based generation of nondiffracting beams," arxiv, physicsarXiv:1911.03103, Nov. 2019, pp. 1-4, Cornell University, New York, NY, USA.
(Continued)

*Primary Examiner* — Topaz L. Elliott
*Assistant Examiner* — Daniel Ward Hatten
(74) *Attorney, Agent, or Firm* — LEYDIG, VOIT & MAYER, LTD.

(57) ABSTRACT

A method for laser processing of a workpiece that has a transparent material includes dividing an input laser beam into a plurality of sub-beams by using a beam splitting element, focusing the sub-beams coupled out of the beam splitting element to form multiple focus elements, and applying the focus elements to the material of the workpiece for the laser processing. The focus elements are moved relative to the material in a feed direction. A first sub-quantity of the focus elements is arranged in a first plane. A second sub-quantity of the focus elements is arranged in at least one other plane. The first plane and the at least one other plane are spaced apart in the feed direction. The first plane and the at least one other plane are orientated perpendicular to the feed direction.

15 Claims, 8 Drawing Sheets

(58) Field of Classification Search
USPC .................................................. 219/121.73
See application file for complete search history.

(56) References Cited

U.S. PATENT DOCUMENTS

| | | | |
|---|---|---|---|
| 2015/0299018 A1* | 10/2015 | Bhuyan | B23K 26/40 |
| | | | 65/29.18 |
| 2019/0135678 A1* | 5/2019 | Liu | B23K 26/0617 |
| 2020/0147729 A1 | 5/2020 | Chang et al. | |
| 2020/0201057 A1* | 6/2020 | Kumkar | B23K 26/0624 |
| 2020/0361037 A1 | 11/2020 | Ivanov et al. | |
| 2020/0376603 A1 | 12/2020 | Ortner et al. | |
| 2022/0258284 A1 | 8/2022 | Flamm et al. | |
| 2023/0036386 A1* | 2/2023 | Taylor | B23K 26/0652 |
| 2023/0182234 A1 | 6/2023 | Flamm et al. | |
| 2024/0139867 A1 | 5/2024 | Haug et al. | |
| 2024/0181563 A1 | 6/2024 | Kleiner et al. | |

FOREIGN PATENT DOCUMENTS

| | | | | | |
|---|---|---|---|---|---|
| DE | 102018126381 A1 | 8/2019 | | | |
| DE | 102019217577 A1 | 5/2021 | | | |
| DE | 102020207715 A1 | 12/2021 | | | |
| DE | 102021118390 A1 | 1/2023 | | | |
| DE | 102021120286 A1 | 2/2023 | | | |
| DE | 102021121469 A1 | 2/2023 | | | |
| EP | 3597353 A1 | 1/2020 | | | |
| JP | 2009190069 A | 8/2009 | | | |
| JP | 2020004889 A | 1/2020 | | | |
| JP | 2021136253 A | 9/2021 | | | |
| KR | 20120016457 A | * | 2/2012 | ........... | B23K 26/064 |
| WO | WO 2016089799 A1 | 6/2016 | | | |
| WO | WO-2017073907 A1 | * | 5/2017 | ............ | B23K 26/06 |
| WO | WO 2022167254 A1 | 8/2022 | | | |
| WO | WO 2022167257 A1 | 8/2022 | | | |

OTHER PUBLICATIONS

Ioannis D. Chremmos et al., "Bessel-like optical beams with arbitrary trajectories," Optics Letters, 2012, pp. 5003-5005, vol. 37, Issue 23, Optical Society of America, Washington, D.C., USA.

Daniel Flamm et al., "Structured light for ultrafast laser micro- and nanoprocessing," Optical Engineering, Feb. 2021, pp. 025105, vol. 60, Issue 2, Spie, Bellingham, Washington, USA.

Kazuyoshi Itoh et al., "Ultrafast Processes for Bulk Modification of Transparent Materials," MRS Bulletin, Jan. 2011, pp. 621-625, vol. 31, Issue 8, Cambridge University Press, Cambridge University Press.

Mike Woerdemann, "Chapter 5: Non-diffracting beams for the threedimensional moulding of matter. In: Structured light fields : applications in optical trapping, manipulation, andorganisation." Springer Theses, Jan. 2012, pp. 67-81, Berlin, Germany.

* cited by examiner

METHOD AND DEVICE FOR LASER PROCESSING A WORKPIECE

CROSS REFERENCE TO RELATED APPLICATIONS

This application is a continuation of International Application No. PCT/EP2023/076954 (WO 2024/104646 A1), filed on Sep. 28, 2023, and claims benefit to German Patent Application No. DE 10 2022 130 022.6, filed on Nov. 14, 2022. The aforementioned applications are hereby incorporated by reference herein.

FIELD

Embodiments of the present invention relate to a method for laser processing of a workpiece having a transparent material. Embodiments of the present invention also relate to a device for laser processing of a workpiece.

BACKGROUND

WO 2022/167254 A1 and WO 2022/167257 A1 each disclose methods and devices for laser processing of a transparent workpiece, wherein the workpiece is applied with a multitude of focus elements for the laser processing.

DE 10 2014 116 958 A1 discloses a diffractive optical beam forming element for applying a phase profile to a laser beam provided for laser processing of a material substantially transparent to the laser beam using a phase mask, which is formed for applying a plurality of beam-forming phase profiles to the laser beam incident on the phase mask, and at least one of the plurality of beam-forming phase profiles is associated with a virtual optical image, which can be imaged in at least one elongated focus zone to form a modification in the material to be processed.

A method for severing a transparent material using an elongated focus zone of a laser beam is known from EP 3 597 353 A1.

A method for severing and in particular beveling a transparent material is known from JP 2020 004 889 A, wherein a plurality of focal points for laser processing of the material are generated using a spatial light modulator.

Methods for forming a beveled edge region on a transparent material using a laser beam are known from US 2020/0147729 A1 and US 2020/0361037 A1.

A method for severing a transparent material using multiple parallel non-diffracting laser beams is known from WO 2016/089799 A1.

SUMMARY

Embodiments of the present invention provide a method for laser processing of a workpiece that has a transparent material. The method includes dividing an input laser beam into a plurality of sub-beams by using a beam splitting element, focusing the sub-beams coupled out of the beam splitting element to form multiple focus elements, and applying the focus elements to the material of the workpiece for the laser processing. The focus elements are moved relative to the material in a feed direction. A first sub-quantity of the focus elements is arranged in a first plane. A second sub-quantity of the focus elements is arranged in at least one other plane. The first plane and the at least one other plane are spaced apart in the feed direction. The first plane and the at least one other plane are orientated perpendicular to the feed direction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
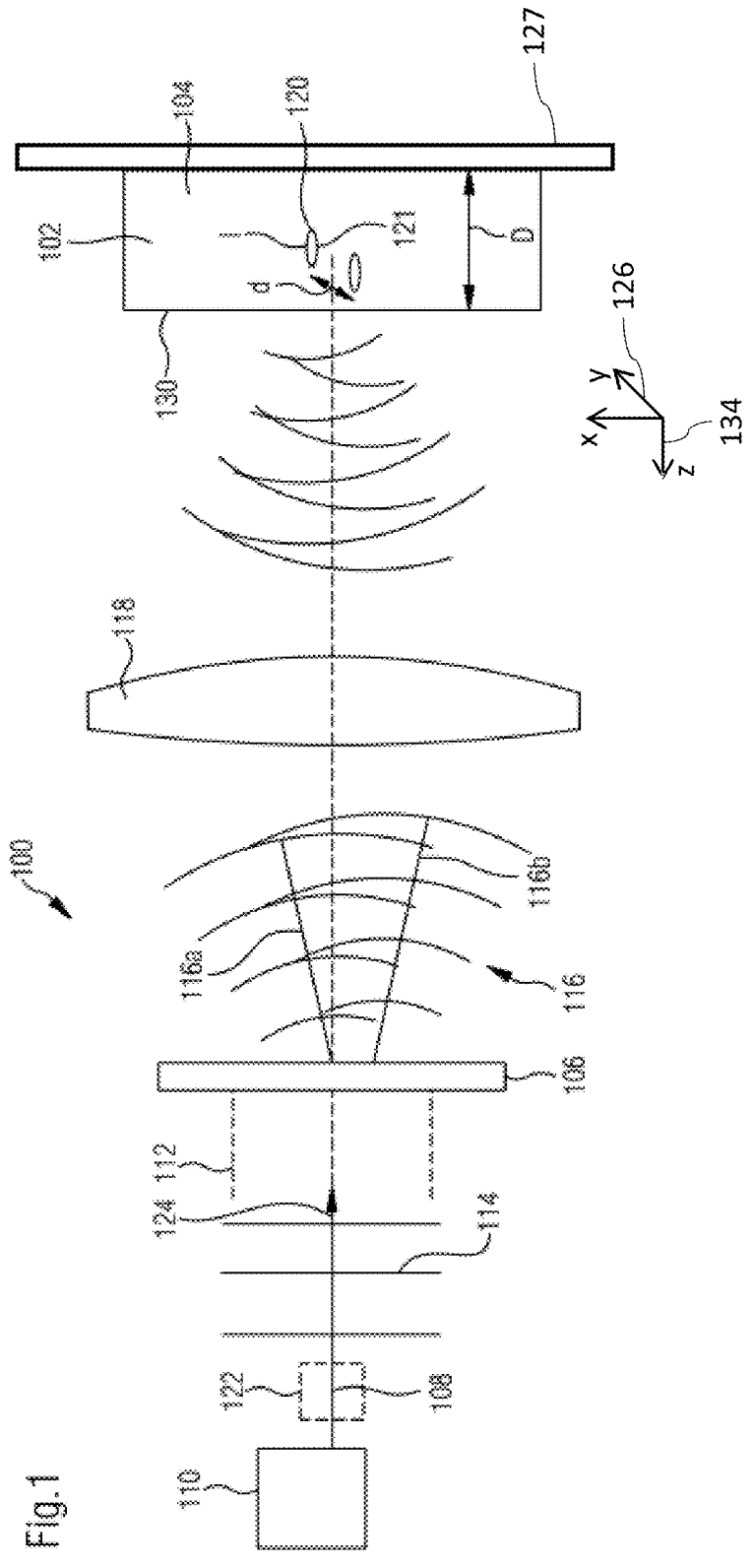
FIG. 1 shows a schematic illustration of one exemplary embodiment of a device for laser processing of a workpiece.

Embodiments of the present invention provide a method and a device by means of which material modifications can be formed in the material of the workpiece, which enable a severing of the material with an improved quality and in particular a reduced roughness at the severing surface.

According to some embodiments, in a method for laser processing of a workpiece having a transparent material, an input laser beam is divided into a plurality of sub-beams by means of a beam splitting element, and sub-beams coupled out of the beam splitting element are focused, multiple focus elements are formed by focusing the sub-beams, focus elements are applied to the material of the workpiece for the laser processing, and the focus elements are moved relative to the material in a feed direction. A sub-quantity of the formed focus elements is arranged in a first plane and a sub-quantity of the formed focus elements is arranged in at least one further plane, wherein the first plane and the at least one further plane are spaced apart parallel to the feed direction and wherein the first plane and the at least one further plane are orientated perpendicular to the feed direction.

During the laser processing of the workpiece by means of the method according to embodiments of the invention, material modifications are produced in the material of the workpiece which in particular enable severing of the material.

By arranging focus elements both in the first plane and in at least one further plane, an effective distance of the focus elements orientated perpendicular to the feed direction can be reduced. This allows adjacent material modifications to be produced in the material of the workpiece with a particularly small distance between them, which in turn increases the density of the material modifications formed in the material. This improves the severability of the material. In addition, the quality of a severing surface resulting from the severing of the material can be increased, and the severing surface can in particular be designed with a reduced roughness and/or increased smoothness. This results in increased edge stability of the workpiece material at the severing surface after severing has taken place.

If an actual distance of the mutually adjacent focus elements becomes too small, undesired interference effects between adjacent focus elements can arise from this, which can have the consequence, for example, of beat effects in the intensity of the focus elements. This can make it difficult to control the production of the material modifications and in particular make it difficult to produce identical material modifications. In the solution according to embodiments of the invention, the focus elements for producing the material modifications are arranged 'offset' in the feed direction, which results in a significantly reduced effective distance when the actual distance between the focus elements is sufficiently large.

The distance or actual distance between focus elements is the actual distance between these focus elements in three-dimensional space. The effective distance between the focus elements is the distance between perpendicular projections of the focus elements in a projection plane orientated perpendicular to the feed direction.

A spatial position and/or arrangement of a specific focus element is to be understood in particular as that of its center and/or center of gravity within the material. In particular, the distance and the effective distance are related to the corresponding centers of the focus elements in the material, i.e. they are center distances.

By relative movement of the focus elements arranged in the first plane and the at least one further plane with respect to the material in the feed direction, material modifications are produced at least in portions of the material which are spaced apart by the effective distance.

With the method according to embodiments of the invention, the material modifications can be produced in particular in such a way that adjacent material modifications overlap in the material. This results in a crack connection between the adjacent material modifications, which enables the material to be severed particularly well by etching or applying heat.

By applying the focus elements to the material of the workpiece at a specific point in time, material modifications are produced which are located in the material at positions where the focus elements are positioned in the material at that point in time.

In particular, all focus elements associated with the first plane and/or the at least one further plane are present simultaneously.

For example, two or more planes orientated perpendicular to the feed direction can be provided, in each of which a sub-quantity of the formed focus elements is arranged. The intended planes are orientated parallel to each other and/or spaced apart from each other in the feed direction.

In particular, it is possible for a distance between the first plane and the at least one further plane to at least 2 µm and/or at most 200 µm. For example, the distance is approximately 10 µm.

In particular, it is possible for the formed focus elements to be positioned such that, when the focus elements are viewed in a projection plane orientated perpendicular to the feed direction, at least one sub-quantity of focus elements associated with the first plane and focus elements associated with the at least one further plane are arranged at different spatial positions in the projection plane. This makes it possible to reduce the effective distance between adjacent focus elements, such that the distance between formed adjacent material modifications is reduced accordingly.

In particular, it is possible for the formed focus elements to be positioned such that, when viewing the focus elements in a projection plane orientated perpendicular to the feed direction, at least a sub-quantity of focus elements associated with the first projection plane and focus elements associated with the at least one further projection plane are positioned in the projection plane along a processing line, wherein, by relative movement of the focus elements in relation to the material in the feed direction, material modifications are produced in the material which are arranged along the processing line. In particular, an edge geometry and/or a cross-sectional geometry of a severing surface arising due to severing of the material at the material modifications may be defined by means of the processing line.

For example, the at least one processing line has a total length of between 10 µm and 10000 µm and in particular between 100 µm and 1000 µm and in particular between 400 µm and 600 µm. Workpieces having a thickness in the stated range can thus be processed and in particular severed.

The material of the workpiece has, for example, a thickness of between 10 µm and 10000 µm and preferably between 100 µm and 1000 µm, for example approximately 500 µm.

In particular, it is possible for the processing line to be formed spatially continuously over a thickness of the material of the workpiece and/or over a thickness of a workpiece segment to be detached from the workpiece.

The processing line is not necessarily of spatially contiguous design, but rather may have different, spatially separate portions. In particular, the processing line can have interruptions, in which no focus elements are arranged.

In particular, material modifications along a processing surface corresponding to the processing line are produced by the relative movement of the focus elements in the material. The material modifications are then arranged along the processing line, particularly when viewed in a cross-section, orientated perpendicular to the feed direction, through the processing surface. After the workpiece has been severed at the material modifications arranged along the processing surface, a shape and/or cross-sectional shape of the severing surface formed during the severing then corresponds in particular to a shape and/or cross-sectional shape of the (previous) processing surface.

It may be advantageous if adjacent focus elements arranged along the processing line have an effective distance of at least 2 µm and/or at most 200 µm in the projection plane. This allows the severing surface to be produced with particularly high quality and/or reduced roughness.

The focus elements arranged along the processing line and/or viewed in the projection plane are understood to mean the focus elements which are associated with the first plane and the at least one further plane.

In particular, the effective distance of the focus elements along the processing line corresponds at least approximately to a distance of material modifications which are formed on the processing surface corresponding to the processing line and are positioned in a cross-section, orientated perpendicular to the feed direction, through the processing surface.

In particular, it is possible for an effective distance of adjacent focus elements arranged along the processing line in the projection plane and/or an intensity of the focus elements to be selected such that, by applying the focus elements to the material and relative movement of the focus elements in relation to the material in the feed direction, material modifications are produced in the material which enable a severing of the material.

In particular, it is possible for at least a sub-quantity of adjacent focus elements arranged along the processing line to at least approximately spaced apart in the projection plane with the same effective distance from one another.

It may be advantageous that at least a sub-quantity of adjacent focus elements arranged along the processing line is spaced apart at an effective distance, the effective distance having an effective distance component different to zero which is orientated parallel to a thickness direction of the workpiece, and/or having a further effective distance component different to zero which is orientated perpendicular to the thickness direction of the workpiece. Thus, for example, a perpendicular cut can be produced on the workpiece or the workpiece can be chamfered at a specific angle.

The thickness direction of the workpiece is to be understood in particular to mean a direction which is orientated transverse and in particular perpendicular to an outer side of the workpiece through which the focus elements and/or a laser beam for forming the focus elements are coupled into the material.

The thickness direction is orientated in particular transversely or perpendicularly to a beam propagation direction of a laser beam from which the focus elements are formed.

In particular, it is possible for at least a sub-quantity of mutually adjacent focus elements arranged along the processing line to be spaced apart at an effective distance, the effective distance having an effective distance component different to zero which is orientated parallel to a beam propagation direction of a laser beam from which the focus elements are formed, and/or for at least a sub-quantity of mutually adjacent focus elements arranged along the processing line to be spaced apart at an effective distance, the effective distance having an effective distance component different to zero which is orientated perpendicular to a beam propagation direction of a laser beam from which the focus elements are formed.

For the same reason, it can be advantageous if an angle of attack between the processing line and an outer side of the workpiece, through which the focus elements for laser processing of are coupled into the material of the workpiece, is at least 1° and/or at most 90° and in particular at most 89°, at least in some portions. Depending on the selection of the angle of attack, for example, a perpendicular cut may thus be executed on the workpiece or the workpiece may be chamfered at a specific angle.

The processing line having a specific angle of attack or angle of attack range at least in places is to be understood in particular to mean that the processing line has at least one portion with this angle of attack or angle of attack range.

In particular, the angle of attack can be at least 10° and/or at most 80°, preferably at least 30° and/or at most 60°, particularly preferably at least 40° and/or at most 50°.

In particular, it is possible for the angle of attack of the processing line to be constant at least in places, and/or for the processing line to have multiple portions with different angles of attack.

In particular, it is possible for the processing line to be a straight line at least in portions, and/or that the processing line is a curve at least in portions.

By configuring the processing line as a curve, for example, rounded segments can be detached from the workpiece. For example, rounded edges can thus be created.

If the processing line is configured as a curve, the processing line is, for example, associated with a specific angle of attack range, which the processing line has with respect to an outer side of the workpiece.

It can be advantageous if the formed focus elements are positioned such that, when the focus elements are viewed in a projection plane orientated perpendicular to the feed direction, gaps are formed between mutually adjacent focus elements associated with the first plane, there being focus elements associated with the at least one further plane which are arranged in the gaps. This makes it possible to reduce the effective distance between adjacent focus elements and/or increase the density of material modifications produced in the material.

In particular, it is possible for a distance between mutually adjacent focus elements associated with the first plane to be at least 3 µm and/or at most 70 µm and in particular at least 5 µm and/or at most 10 µm.

In particular, it is possible for a distance between mutually adjacent focus elements associated with the at least one further plane to be at least 3 µm and/or at most 70 µm and in particular at least 5 µm and/or at most 10 µm.

In particular, it is possible for a dividing of the input laser beam by means of the beam splitting element to take place by phase imprinting on a beam cross-section of the input laser beam or to comprise a phase imprinting on a beam cross-section of the input laser beam. The focus elements can thus be formed, for example, as copies of one another. In particular, the focus elements can thereby be introduced in a technically simple manner at different positions and/or with different spacings into the material of the workpiece.

It is possible for the dividing of the input laser beam to take place exclusively by phase imprinting on the beam cross-section of the input laser beam.

In particular, the phase imprinting takes place in the transverse direction of the input laser beam. The transverse direction lies in a plane orientated perpendicular to the beam propagation direction of the input laser beam.

Alternatively or additionally, it is possible for a dividing of the input laser beam by means of the beam splitting element to take place by polarization beam splitting or to comprise polarization beam splitting. Then, mutually adjacent focus elements can, for example, each be formed with different polarization states. This makes it possible to prevent interference between mutually adjacent focus elements, which means that they can be arranged at a particularly small distance from one another.

It is possible in principle for the dividing of the input laser beam to take place both by means of phase imprinting and by means of polarization beam splitting.

In particular, the input laser beam and/or a laser beam from which the focus elements are formed is a pulsed laser beam and in particular an ultrashort pulse laser beam. By applying the focus elements to the material, in particular laser pulses and in particular ultrashort laser pulses are thereby introduced into the material.

The material modifications introduced into transparent materials by ultrashort laser pulses are subdivided into three different classes; see K. Itoh et al. "Ultrafast Processes for Bulk Modification of Transparent Materials" MRS Bulletin, vol. 31, p. 620 (2006): type I is an isotropic refractive index change; type II is a birefringent refractive index change; and type III is a void or cavity. The type of material modification produced by a particular focus element depends on laser parameters of the laser beam from which the corresponding focus element is formed, such as the pulse duration, the wavelength, the pulse energy and the repetition frequency of the laser beam. Furthermore, the type of modification depends on the properties of the material, such as the electronic structure and the thermal coefficient of expansion of the material, as well as the numerical aperture (NA) used when focusing the laser beam into the corresponding focus element.

Type I isotropic refractive index changes are attributed to spatially restricted melting by the laser pulses and fast resolidification of the transparent material. For example, quartz glass has a higher material density and refractive index if the quartz glass is cooled down quickly from a higher temperature. Thus, if the material in the volume detected by the focus element melts and then cools rapidly, the quartz glass has a higher refractive index in the regions of material modification than in the unmodified regions.

Type II birefringent refractive index changes may arise, for example, due to interference between an ultrashort laser pulse and the electric field of the plasma generated by the laser pulses. This interference leads to periodic modulations in the electron plasma density, which upon solidification leads to a birefringent property, that is to say direction-dependent refractive indices, of the transparent material. Type II modification is, for example, also accompanied by the formation of nanogratings.

In particular, the voids (cavities) of the type III modifications can be produced using a high laser pulse energy. Formation of the voids is in this case attributed to an explosive expansion of highly excited, vaporized material from the focus volume into the surrounding material. This process is also referred to as microexplosion. Since this expansion occurs within the mass of the material, the microexplosion leaves behind a less dense or hollow core (the void), or a microscopic defect in the sub-micrometer range or in the atomic range, which void or defect is surrounded by a compacted material envelope. Compaction at the shock front of the microexplosion creates stresses in the transparent material, which regularly lead to spontaneous crack formation or promote crack formation.

Therefore, when the introduction of a type III modification is concerned, then a less dense or hollow core or a defect is present in any case. By way of example, in the case of a type III modification in sapphire, a region of lower density rather than a void is produced by the microexplosion.

In particular, the formation of voids can also be accompanied by type I and type II modifications. By way of example, type I and type II modifications can arise in the less stressed areas around the introduced laser pulses. The formation of type I and type II modifications cannot be fully prevented or avoided when introducing type III modifications. It is therefore unlikely that "pure" type III modifications are to be found.

It can be advantageous if material modifications are produced in the material by applying the focus elements to the material of the workpiece, the material modifications being accompanied by crack formation in the material, and/or the material modifications being type III material modifications. In particular, the material can be severed by means of these material modifications.

It can be favorable if material modifications are formed in the material by applying the focus elements to the material of the workpiece, the material modifications being accompanied by a change of a refractive index of the material, and/or the material modifications being type I material modifications and/or type II material modifications. In particular, the material can be severed by means of these material modifications.

In particular, it is possible for the material of the workpiece to be severable or severed after laser processing, with it being possible in particular for the material to be severable or severed at a processing surface where material modifications were produced by means of the laser processing.

In particular, it is possible for the material of the workpiece to be severable or severed by applying heat and/or a mechanical tension and/or by etching by means of at least one wet-chemical solution. For example, the etching takes place in an ultrasound-assisted etching bath. The application of heat can be achieved, for example, by means of a $CO_2$ laser.

According to some embodiments, a device for laser processing of a workpiece having a transparent material includes a beam splitting element for dividing an input laser beam into a plurality of sub-beams, a focusing optical unit for focusing sub-beams coupled out of the beam splitting element, multiple focus elements for laser processing of the workpiece being formed by focusing the sub-beams, and a feed apparatus for carrying out a relative movement of the focus elements relative to the material of the workpiece in a feed direction. The beam splitting element and the focusing optical unit are configured to arrange the focus elements in such a way that a sub-quantity of the formed focus elements are arranged in a first plane and a sub-quantity of the formed focus elements are arranged in at least one other plane, the first plane and the at least one other plane being spaced apart in parallel with the feed direction, and the first plane and the at least one other plane being orientated perpendicular to the feed direction.

In particular, the device according to embodiments of the invention has one or more further features and/or advantages of the method according to embodiments of the invention. Advantageous embodiments of the device according to embodiments of the invention have already been explained in connection with the method according to embodiments of the invention.

In particular, the method according to embodiments of the invention can be carried out by means of the device according to embodiments of the invention, or the method according to embodiments of the invention is carried out by means of the device according to embodiments of the invention.

It can be advantageous if the beam splitting element is formed as a 3D beam splitting element or comprises a 3D beam splitting element. It is then possible for the dividing of the input laser beam to take place by phase imprinting on a beam cross-section of the input laser beam and in particular exclusively by phase imprinting on the beam cross-section of the input laser beam.

It can be favorable if the beam splitting element is formed as a polarization beam splitting element or comprises a polarization beam splitting element.

For example, the beam splitting element comprises multiple components and/or functionalities. It is possible for the beam splitting element to comprise both a 3D beam splitting element and a polarization beam splitting element.

In particular, the device comprises a laser beam source for providing the input laser beam, the input laser beam being in particular a pulsed laser beam and/or an ultrashort pulse laser beam.

In particular, a transparent material is to be understood to mean a material through which at least 70% and in particular at least 80% and in particular at least 90% of a laser energy of the input laser beam and/or of a laser energy of a laser beam from which the focus elements are formed is transmitted.

In particular, a focus element is to be understood as a radiation region having a specific spatial extension and intensity distribution. To determine spatial dimensions of a specific focus element, such as, for example, a diameter of the focus element, only intensity values of the intensity distribution above a specific intensity threshold are considered. In this regard, the intensity threshold is selected, for example, such that values below this intensity threshold have such a low intensity that they are no longer relevant for interaction with the material for the purpose of producing material modifications. For example, the intensity threshold is 50% of a global intensity maximum of the focus element.

In particular, a specific focus element is associated with a spatial region of interaction, in which the focus element interacts with the material of the workpiece when it is introduced into this material.

In particular, the focus elements introduced into the material interact with the material by nonlinear absorption. In particular, material modifications are produced in the material due to nonlinear absorption by means of the focus elements.

In particular, it is possible for the focus elements according to the preceding definition to have a maximum spatial extension of at least 0.5 µm and/or at most 30 µm, preferably at least 2 µm and/or at most 10 µm. In particular, a maximum spatial extension of a region of interaction, associated with a given focus element, with the material of the workpiece is at least 0.5 µm and/or at most 30 µm, and preferably at least 2 µm and/or at most 10 µm.

The maximum spatial extension of a given focus element is to be understood in particular to mean the greatest spatial extension of the focus element in any spatial direction.

In particular, a maximum spatial extension of the focus elements is less than 20% and preferably less than 10% and particularly preferably less than 5% of a thickness of the material.

In particular, the focus elements have a diffracting beam profile. In particular, the focus elements are designed to be diffraction-limited. For example, a specific focus element has a Gaussian shape and/or a Gaussian intensity profile.

In particular, the input laser beam and/or a laser beam from which the focus elements are formed has a diffracting beam profile and/or a Gaussian beam profile.

For example, a wavelength of the input laser beam and/or of the laser beam from which the focus elements are formed is at least 300 nm and/or at most 1500 nm. For example, the wavelength is 515 nm or 1030 nm.

In particular, the input laser beam and/or the laser beam from which the focus elements are formed has an average power of at least 1 W to 1 kW. For example, the laser beam comprises pulses having a pulse energy of at least 10 µJ and/or at most 50 mJ. It is possible for the laser beam to comprise individual pulses or bursts, with the bursts having 2 to 20 subpulses and in particular a time interval of approximately 20 ns.

The statement "at least a sub-quantity of the focus elements" can mean either a sub-quantity of the focus elements or a total amount of the focus elements, i.e. all focus elements.

In particular, the statements "at least approximately" or "approximately" should be understood to mean in general a deviation of at most 10%. Unless stated otherwise, the statements "at least approximately" or "approximately" are to be understood to mean in particular that an actual value and/or distance and/or angle deviates by no more than 10% from an ideal value and/or distance and/or angle.

Elements that are the same or have equivalent functions are provided with the same reference signs in all of the figures.

One exemplary embodiment of a device for laser processing of a workpiece is shown in FIG. 1 and denoted by 100 therein. Localized material modifications, such as defects in the sub-micrometer range or atomic range, which result in material weakening, may be produced in a material 102 of the workpiece 104 using the device 100. At these material modifications, the workpiece 104 can be severed, wherein a workpiece segment can, for example, be detached from the workpiece 104.

In particular, material modifications can be introduced into the material 102 at an angle of attack using the device 100, such that an edge region of the workpiece 104 can be chamfered or beveled by detaching a workpiece segment from the workpiece 104.

The device comprises a beam splitting element 106, into which an, in particular collimated, input laser beam 108 is coupled. This input laser beam 108 is provided, for example, by a laser beam source 110. In particular, the input laser beam 108 is a pulsed laser beam and/or an ultrashort pulse laser beam.

It is possible for the laser beam source 110 to comprise a hollow-core fiber (not shown) from which a laser beam formed by means of the laser beam source emerges. This laser beam is then collimated, for example, by means of a collimation optical unit (not shown) of the laser beam source 110 to form the collimated input laser beam 108.

In particular, the input laser beam 108 is to be understood to mean a beam bundle comprising a plurality of beams extending in particular in parallel. The input laser beam 108 in particular has a transverse beam cross-section 112 and/or a transverse beam expansion with which the input laser beam 108 impinges on the beam splitting element 106. The input laser beam 108 impinging on the beam splitting element 106 in particular has at least approximately planar wavefronts 114.

The input laser beam 108 is divided by the beam splitting element 106 into a plurality of sub-beams 116 and/or sub-beam bundles. In the example shown in FIG. 1, two different sub-beams 116a and 116b are indicated.

In particular, the beam splitting element 106 takes the form of a far-field beam forming element. The sub-beams 116 or sub-beam bundles coupled out of the beam splitting element 106 in particular have a divergent beam profile and/or propagate in the manner of spherical waves.

To focus the sub-beams 116 coupled out of the beam splitting element 106, the device 100 comprises a focusing optical unit 118, into which the sub-beams 116 are coupled. The focusing optical unit 118 has one or more lens elements, for example. For example, the focusing optical unit 118 is formed as a microscope objective.

For example, the focusing optical unit 118 has a focal length between 5 mm and 50 mm.

The beam splitting element 106 is in particular at least approximately arranged in a rear focal plane of the focusing optical unit 118.

In particular, different sub-beams 116 impinge on the focusing optical unit 118 with a position offset and/or angular offset. These sub-beams 116 are focused by means of the focusing optical unit 118 so that multiple focus elements 120 are formed, which are each arranged at different spatial positions. It is possible in principle for mutually adjacent focus elements to spatially overlap in portions.

For example, one or more sub-beams 116 and/or sub-beam bundles are each associated with a given focus element 120. For example, a focus element 120 is formed by focusing one or more sub-beams 116 and/or sub-beam bundles.

A focus element 120 is to be understood in particular as a focused radiation region, such as a focus spot and/or a focus point. In particular, the focus elements 120 each have a specific geometric shape and/or a specific intensity profile, and the geometric shape is to be understood, for example, as a spatial shape and/or a spatial extension of the focus element 120.

The geometric shape and/or the intensity profile of a specific focus element 120 is referred to hereinafter as the focus distribution 121 of the focus element 120. The focus distribution 121 is a property of the focus elements 120 and describes their shape and/or intensity profile. In particular, multiple focus elements 120 or all focus elements 120 formed have the same focus distribution.

The focus distribution of the focus elements 120 formed is defined by the input laser beam 108, the dividing of which using the beam splitting element 106 forms the focus elements 120. If the input laser beam 108 were focused before being coupled into the beam splitting element 106, a single focus element would thus be formed having the focus distribution associated with the input laser beam 108.

For example, the input laser beam 108, if it is provided, for example, by means of the laser beam source 110, has a Gaussian beam profile. By focusing the input laser beam 108, a focus element would be formed in this case, which has a focus distribution with a Gaussian shape and/or Gaussian intensity profile.

Alternatively thereto, for example, it is possible for a Bessel-like beam profile to be associated with the input laser beam 108, so that, by focusing the input laser beam 108, a focus element would be formed which has a focus distribution having Bessel-like shape and/or Bessel-like intensity profile.

The focus distribution of the input laser beam 108 is associated with the sub-beams 116 and/or sub-beam bundles formed by dividing of the input laser beam 108 using the beam splitting element 106 such that by focusing the sub-beams 116, the focus elements 120 are formed with this focus distribution and/or with a focus distribution based on this focus distribution.

In the example shown in FIG. 1, the input laser beam 108 has a Gaussian beam profile, i.e., a focus distribution with a Gaussian shape and/or Gaussian intensity profile is associated with the input laser beam 108. The focus elements 120 then each, for example, have the focus distribution 121 having this Gaussian shape and/or this Gaussian intensity profile or having a shape and/or intensity profile based on this Gaussian shape and/or this Gaussian intensity profile (cf. also FIGS. 5a and 5b).

If, for example, a Bessel-like beam profile is associated with the input laser beam 108, the focus elements 120 formed for laser processing of the workpiece 104 each have a focus distribution 121 having this Bessel-like beam profile or having a beam profile based on this Bessel-like profile. The focus elements 120 can thus each be formed, for example, with a focus distribution that has an elongate shape and/or an elongate intensity profile.

It is possible for the device 100 to have a beam forming apparatus 122 for beam forming of the input laser beam 108 (indicated in FIG. 1). For example, this beam forming apparatus 122 is arranged upstream of the beam splitting element 106 and/or between the laser beam source 110 and the beam splitting element 106 with respect to a beam propagation direction 124 of the input laser beam 108.

A beam propagation direction is to be understood in particular to mean a main beam propagation direction and/or an average propagation direction of a laser beam and/or beam bundle. The beam propagation direction corresponds in particular to a direction of a Poynting vector associated with the laser beam or beam bundle.

By means of the beam forming apparatus 122, a specific beam profile can be associated with the input laser beam 108, which defines the focus distribution 121 of the focus elements 120.

The beam forming apparatus 122 can be configured, for example, to form a laser beam with a quasi-non-diffracting and/or Bessel-like beam profile from a laser beam with a Gaussian beam profile. For this purpose, the beam forming apparatus 122 is or comprises, for example, an axicon element.

The input laser beam 108 coupled into the beam splitting element 106 then has the quasi-non-diffracting and/or Bessel-like beam profile. The focus elements 120 then accordingly also have this quasi-non-diffracting and/or Bessel-like beam profile or a beam profile based on this beam profile.

With regard to the definition and implementation of quasi-non-diffracting and/or Bessel-like beams, reference is made to the book: "Structured Light Fields: Applications in Optical Trapping, Manipulation and Organisation", M. Wördemann, Springer Science & Business Media (2012), ISBN 978-3-642-29322-1 and also to the scientific publications "Bessel-like optical beams with arbitrary trajectories" by I Chremmos et al., Optics Letters, vol. 37, no. 23, 1 Dec. 2012 and "Generalized axicon-based generation of nondiffracting beams" by K. Chen et al., arXiv:1911.03103v1 [physics.optics], Nov. 8, 2019.

The focus elements 120 are in particular each designed to be identical to one another and/or are each designed as copies of one another by beam splitting using the beam splitting element 106.

Figure 2:
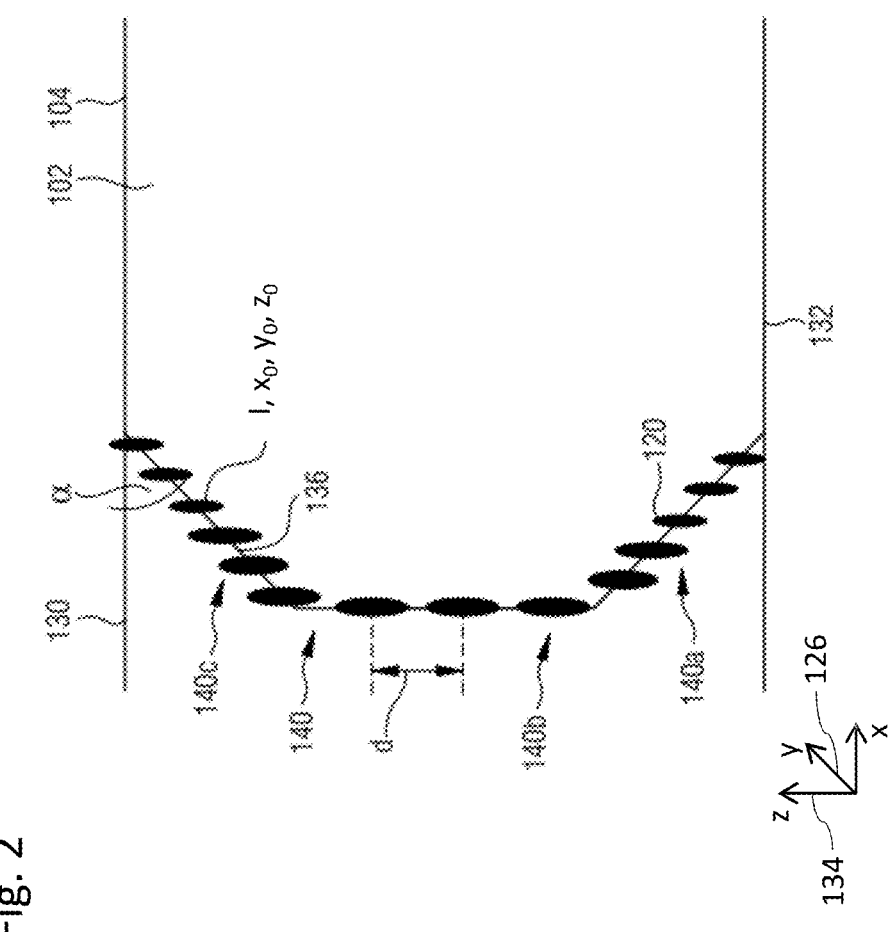
FIG. 2 shows a schematic cross-sectional view of a portion of a material of the workpiece, in which multiple focus elements are applied to the material for laser processing according to some embodiments.

A specific local position $x_0$, $y_0$, $z_0$ is associated with each of the focus elements 120 formed, at which position a focus element 120 is arranged with respect to the material 102 of the workpiece 104 (FIG. 2). For example, the spatial position of a focus element 120 is to be understood to mean the position of its spatial center and/or center of gravity.

Furthermore, a specific intensity I is in particular associated with each of the focus elements 120 formed. The spatial position $x_0$, $y_0$, $z_0$ and in particular also the intensity I of the focus elements 120 can be adjusted using the beam splitting element 106.

In particular, multiple or all focus elements 120 formed for laser processing of the workpiece 104 have the same intensity I. However, it is also possible for multiple focus elements 120 formed to have different intensities I.

In particular, by means of the beam splitting element 106, a distance d and/or a spatial offset between adjacent focus elements 120 can be adjusted, component by component, in three spatial directions and/or spatial dimensions (in the example shown in FIG. 1 in the x-, y- and z-directions).

The beam splitting element 106 preferably takes the form of a 3D beam splitting element or comprises a 3D beam splitting element. The focus elements 120 may thus be formed, for example, such that they are each identical to one another and/or that they each constitute copies of one another.

With respect to the technical implementation and properties of the beam splitting element 106 designed as a 3D beam splitting element, reference is made to the scientific publication "Structured light for ultrafast laser micro- and nanoprocessing" by D. Flamm et al., arXiv:2012.10119v1 [physics.optics], Dec. 18, 2020. Express reference is made to the entire content thereof.

To carry out the beam splitting, in one embodiment of the beam splitting element 106, in which the beam splitting element 106 is embodied, for example, as a 3D beam splitting element, a defined transverse phase distribution is imprinted on the transverse beam cross-section 112 of the input laser beam 108. A transverse beam cross-section or a transverse phase distribution is to be understood in particular to mean a beam cross-section or a phase distribution in a plane orientated transverse and in particular perpendicular to the beam propagation direction 124 of the input laser beam 108.

The focus elements 120 are formed by interference of the focused sub-beams 116, and, for example, constructive interference, destructive interference or intermediate cases thereof can occur, such as partially constructive or partially destructive interference.

To form the focus elements 120 at the position $x_0$, $y_0$, $z_0$ and/or with the distance d, the phase distribution imprinted by means of the beam splitting element 106 has a specific optical grating component and/or optical lens component for each focus element 120.

Owing to the optical grating component, after focusing of the sub-beams 116, a corresponding position offset of the focus elements 120 formed is produced in a first spatial direction and/or second spatial direction, for example in the x and/or y direction. Owing to the optical lens component, sub-beams 116 or sub-beam bundles impinge at different angles or with different convergence or divergence on the focusing optical unit 118, which results after focusing in a position offset in a third spatial direction, for example in the z direction.

The intensity I of the respective focus elements 120 is determined by the phase positions of the focused sub-beams 116 relative to one another. These phase positions can be defined by the optical grating components and optical lens components mentioned above and can be selected in relation to one another when designing the beam splitting element 106 such that the focus elements 120 each have a desired intensity.

Alternatively or additionally, it is possible for the beam splitting element 106 to be formed as a polarization beam splitting element or to comprise a polarization beam splitting element. In this case, polarization beam splitting of the input laser beam 108 into beams which each have one of at least two different polarization states is carried out using the beam splitting element 106.

In particular, the aforementioned polarization states should be understood to mean linear polarization states, and, for example, two different polarization states are provided and/or polarization states orientated perpendicular to one another are provided.

In particular, the polarization states are such that an electric field is orientated in a plane perpendicular to the beam propagation direction of the polarized beams (transverse electric).

For the polarization beam splitting, the beam splitting element 106 comprises, for example, a birefringent lens element and/or a birefringent wedge element. For example, the birefringent lens element and/or the birefringent wedge element are made of a quartz crystal or comprise a quartz crystal.

With regard to the mode of operation and design of the beam splitting element 106 as a polarization beam splitting element, reference is made to the German patent application with the reference number 10 2020 207 715.0 (filing date: Jun. 22, 2020), in the name of the same applicant, and to DE 10 2019 217 577 A1.

In particular, the sub-beams 116 can be formed with different polarization states by the polarization beam splitting. By focusing these sub-beams 116 by means of the focusing optical unit 118, it is possible to form the focus elements 120 in each case from beams having a specific polarization state. The focus elements 120 can thus each be associated with a specific polarization state and/or implemented with a specific polarization state.

In particular, the focus elements 120 can be arranged and formed by polarization beam splitting by means of the beam splitting element 106 such that mutually adjacent focus elements 120 each have different polarization states.

For laser processing of the workpiece 104, the focus elements 120 are introduced into the material 102 of the workpiece 104 and moved relative to the material 102 in the feed direction 126, wherein the focus elements 120 are moved in particular at a specific feed rate in the feed direction 126. In the example shown, the feed direction 126 corresponds to the y direction.

To carry out a relative movement of the focus elements 120 to the material 102, the device 100 comprises a feed apparatus 127 (indicated in FIG. 1). The feed apparatus 127 is configured to move the focus elements 120 in the feed direction 126 at a defined feed rate through the material 102. For example, the feed apparatus can be realized by means of a workpiece holder which is configured to move the workpiece 104 arranged thereon relative to the focus elements 120.

The coupling-in of the focus elements 120, which are introduced into the material 102 for laser processing of the workpiece 104, takes place, for example, through a first outer side 130 of the workpiece 104.

For example, the workpiece 104 is plate-like and/or panel-like and/or disc-like. A second outer side 132 of the workpiece 104 is arranged, for example, spaced apart in the thickness direction 134 and/or depth direction of the workpiece 104 from the first outer side 130.

The material 102 of the workpiece 104 has, for example, an at least approximately constant thickness D with respect to the thickness direction 134. The thickness D is, for example, 500 µm.

The feed direction 126 is orientated transversely of and in particular perpendicular to the beam propagation direction 124 and/or the thickness direction 134 of the workpiece 104.

Figure 4:
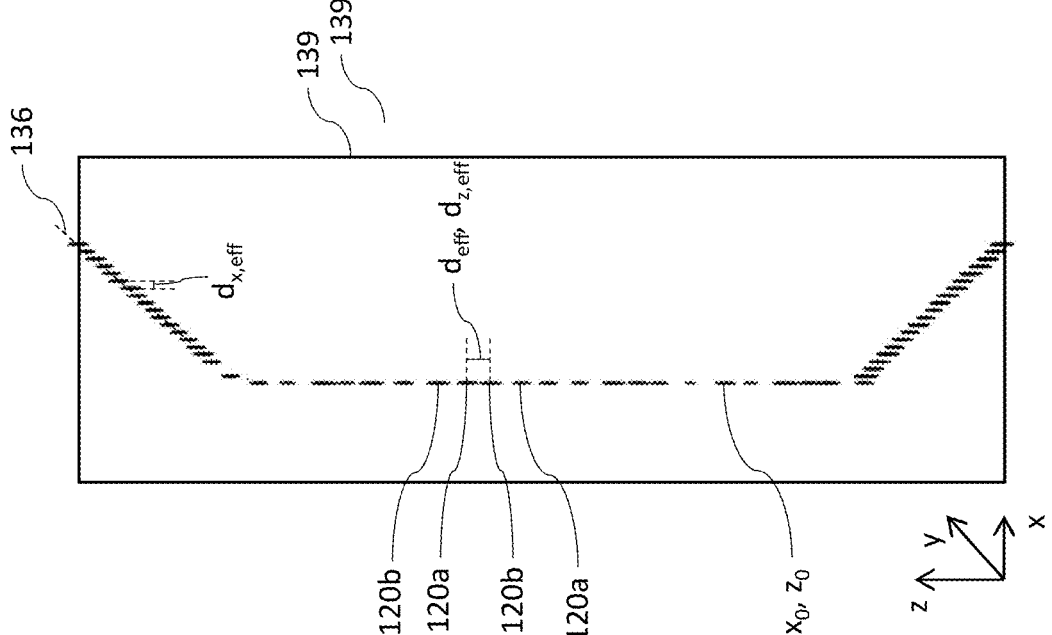
FIG. 4 shows an arrangement of focus elements designed for laser processing of the workpiece, wherein a projection of the focus elements is shown in a projection plane orientated perpendicular to the feed direction, according to some embodiments.

The formed focus elements 120 are preferably arranged such that they are positioned in a projection onto a projection plane 139 orientated transverse and in particular perpendicular to the feed direction 126 along a defined processing line 136 (cf. FIG. 2 and FIG. 4). The aforementioned projection is understood to mean in particular an orthogonal projection of the focus elements 120 onto the projection plane.

The processing line 136 corresponds at least in portions to a target machining geometry with which the laser processing of the material 102 and in particular a subsequent severing of the material 102 is to be carried out.

The focus elements 120 are spaced apart from one another in the projection plane 139 and/or along the processing line 139 with an effective distance $d_{eff}$. The effective distances $d_{eff}$ and intensities I of the focus elements 130 arranged along the processing line 136 are selected such that material modifications 138 are produced by applying the focus elements 120 to the material 102 and moving the focus elements 120 through the material 102 (FIG. 3) and enable severing of the material along this processing line 136 and/or along a processing surface corresponding to this processing line 136.

In particular, it is possible for the processing line 136 to extend between the first outer side 130 and the second outer side 132 and in particular continuously and/or without interruption between the first outer side 130 and the second outer side 132 of the workpiece 104.

It is possible for the processing line 136 to have multiple different portions 140. For example, in the example shown in FIG. 2, the processing line 136 has a first portion 140a, a second portion 140b and a third portion 140c, wherein, with respect to the thickness direction 134, the second portion 140b adjoins the first portion 140a and the third portion 140c adjoins the second portion 140b.

The processing line 136 is not necessarily designed to be regular and/or differentiable. For example, the processing line 136 can have irregularities. It is possible for the processing line 136 to have interruptions and/or gaps at which in particular no focus elements 120 are arranged.

The processing line 136 and/or different portions 140 of the processing line 136 can be formed, for example, as a straight line or curve.

Preferably, two or more planes 141 spaced apart from one another are provided, in each of which different sub-quantities of the formed focus elements 120 are arranged, and the planes 141 are spaced apart parallel to the feed direction 126. For example, the planes 141 are each orientated parallel to the projection plane 139 and/or transverse and in particular perpendicular to the feed direction 126.

Figure 5B:
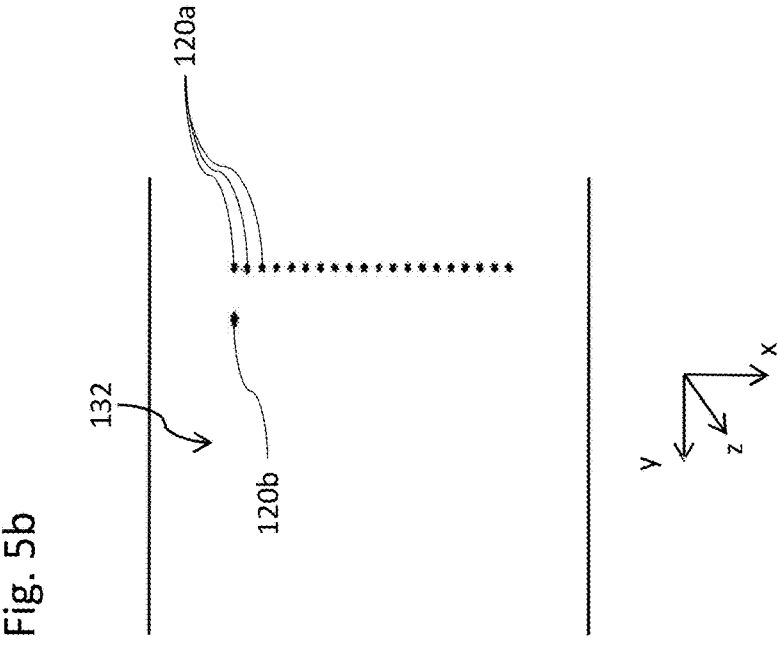
FIG. 5b shows the focus elements according to FIG. 5a in a cross-section orientated parallel to the feed direction and perpendicular to the thickness direction of the workpiece, according to some embodiments.
Figure 5A:
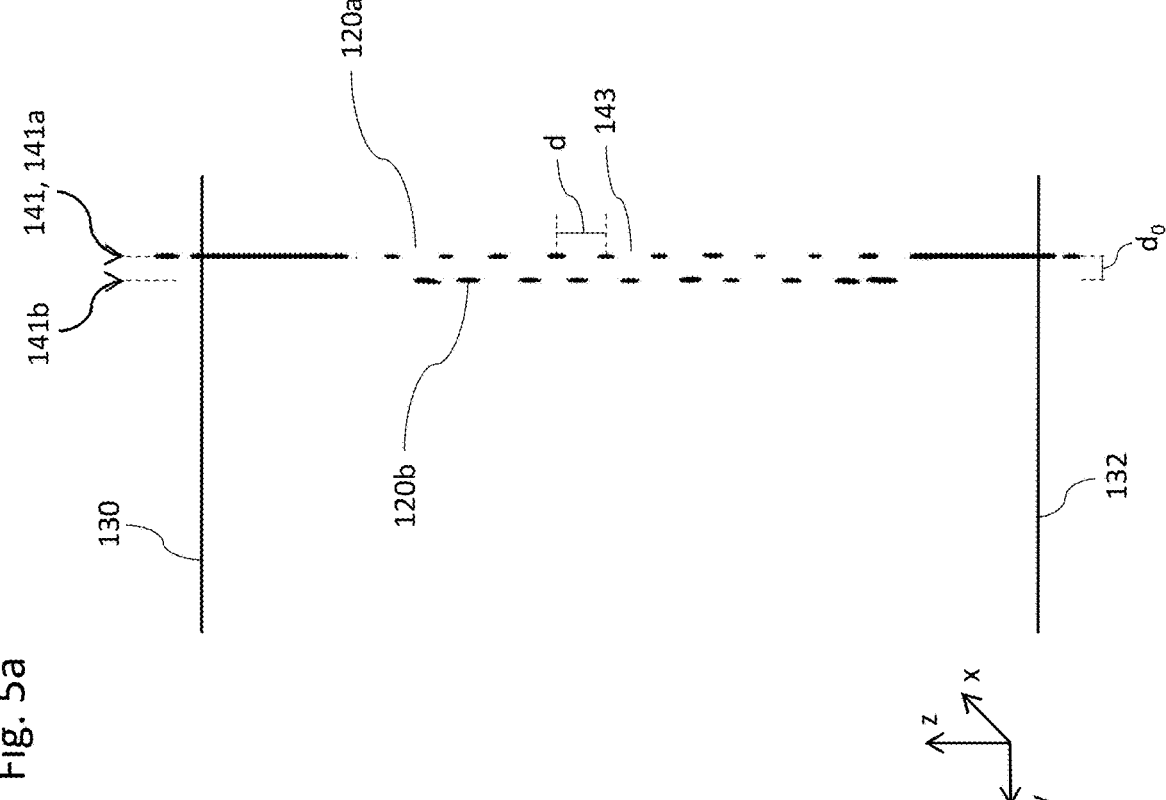
FIG. 5a shows an arrangement of focus elements designed for laser processing of the workpiece in a cross-section orientated parallel to the feed direction and to the thickness direction of the workpiece, according to some embodiments.
Figure 6:
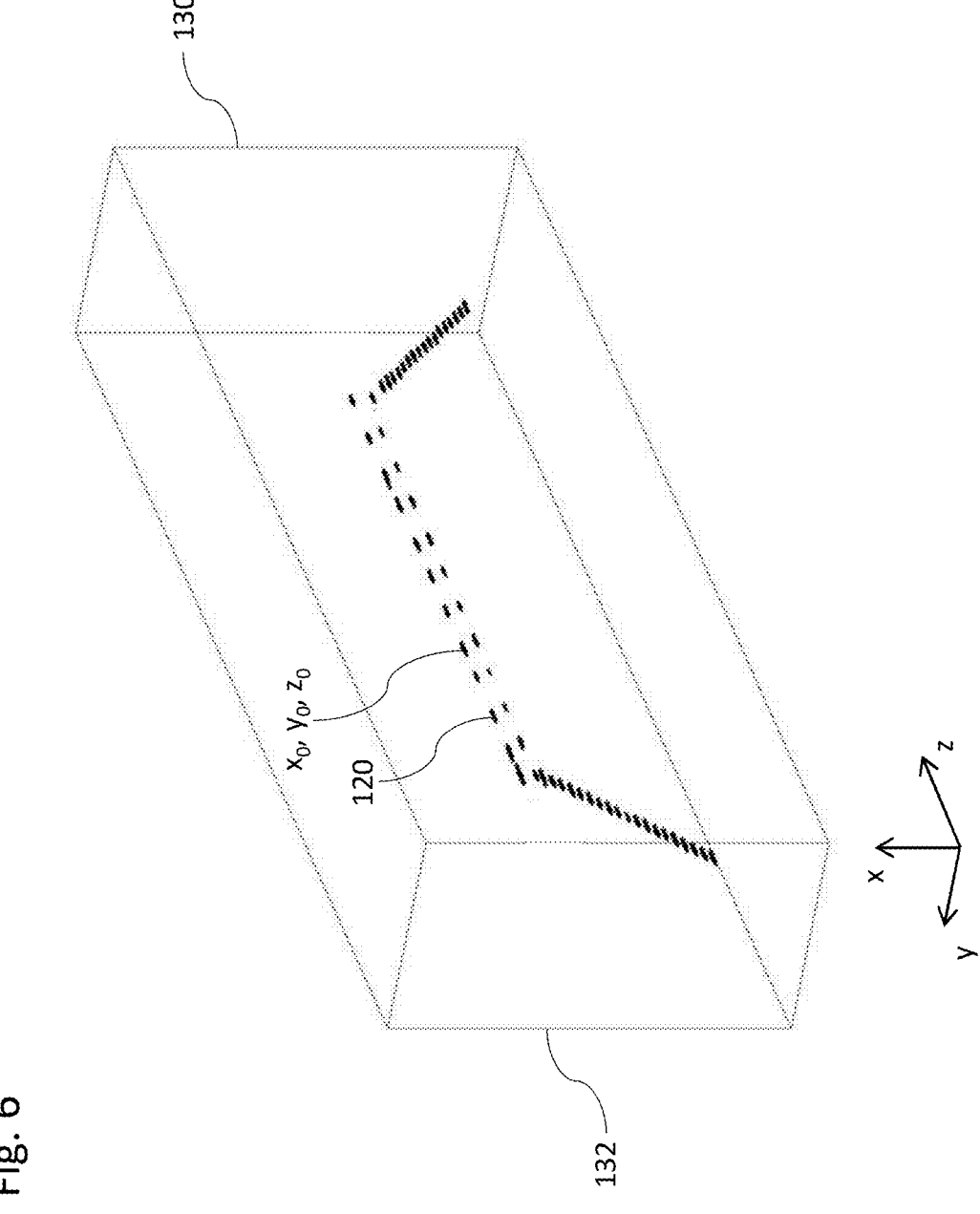
FIG. 6 shows the focus elements according to FIGS. 5a and 5b in a perspective view, according to some embodiments.

In the example shown in FIGS. 5a, 5b and 6, a sub-quantity of the formed focus elements 120 is positioned in a first plane 141a and a further plane, which in the exemplary embodiment shown is referred to as the second plane 141b. The first plane 141a and the second plane 141b are spaced apart from each other in the feed direction 126 and are orientated parallel to each other, for example. The focus elements 120 associated with the first plane 141a are hereinafter referred to as focus elements 120a and the focus elements 120 associated with the second plane 141b are hereinafter referred to as focus elements 120b. In FIG. 4, a total amount of the focus elements 120a and 120b is shown in the form of a projection of these focus elements 120a and 120b onto the projection plane 139.

In particular, focus elements 120a and focus elements 120b are present, which are arranged in the projection plane 139 at different positions $x_0$, $z_0$.

A distance do between the first plane 141a and the second plane 141b is, for example, between 5 µm and 20 µm. Typically the distance do is approximately 10 µm.

The distance d already mentioned above is basically to be understood as the actual distance between adjacent focus elements 120 in the three spatial directions x, y, z and/or spatial dimensions.

The distance d between adjacent focus elements 120 is between 3 µm and 70 µm, preferably between 5 µm and 10 µm. In particular, the distance d between adjacent focus elements 120 which are arranged within a certain plane 141 lies in the mentioned ranges.

Gaps 143 are formed between adjacent focus elements 120 which are associated with a specific plane 141, as shown in FIG. 5a using the example of the focus elements 120a of the first plane 141a.

The second plane 141b contains in particular focus elements 120b, which are positioned such that they lie in the gaps 143 when viewed in the projection plane 139.

The respective effective distance $d_{eff}$ of the focus elements 120 provided for laser processing of the workpiece 104 can be selected differently for different focus elements 120 and/or different pairs of focus elements 120. However, it is fundamentally also possible for the respective distance d to be at least approximately identical for all the focus elements 120 provided for laser processing of the workpiece 104.

For example, it is possible for focus elements 120 having different effective distances $d_{eff}$ to each be associated with different portions 140 of the processing line. In particular, the distances $d_{eff}$ of the focus elements 120 associated with a specific portion 140 are then at least approximately constant.

In particular, an effective distance component $d_{z,eff}$ of the effective distance $d_{eff}$ orientated parallel to the thickness direction 134 of the material 102 and/or perpendicular to the feed direction 126 is different from zero for all focus elements 120 and/or for all pairs of mutually adjacent focus elements 120. In particular, all adjacent focus elements 120 are spaced apart with a non-zero effective distance component $d_{z,eff}$ in the thickness direction 134.

Furthermore, the processing line 136 and/or the portions 140 of the processing line 136 are associated with a specific angle of attack a and/or angle of attack range, which the processing line 136 or the portion 140 forms with the first outer side 130 of the workpiece 104.

In the case of an angle of attack between 1° and 89°, the mutually adjacent focus elements 120 each have a further effective distance component $d_{x,eff}$ of the effective distance $d_{eff}$ which is different from zero and which is orientated perpendicular to the feed direction 126 and perpendicular to the effective distance component $d_{z,eff}$.

The effective distance component $d_{z,eff}$ and the effective distance component $d_{x,eff}$ each lie in a plane orientated perpendicular to the feed direction 126.

In the exemplary embodiment shown, the angle of attack a of the first portion 140a and the third portion 140c is 45° in magnitude and that of the second portion 140b is 90°.

Figure 3:
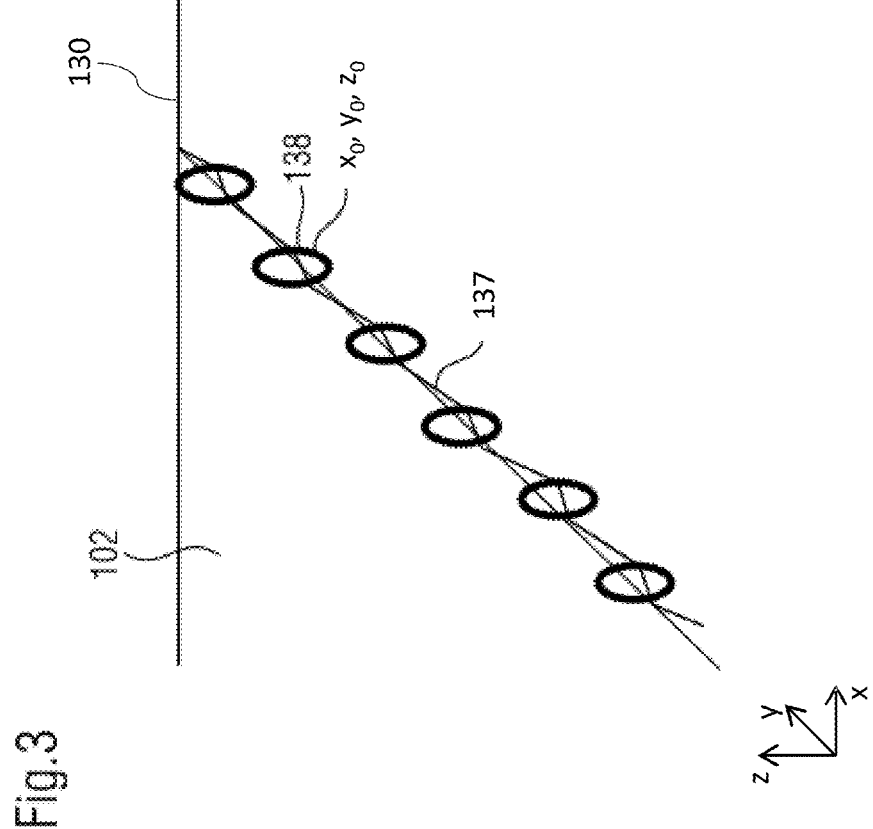
FIG. 3 shows a schematic cross-sectional view of a portion of the workpiece in which material modifications, which are accompanied by crack formation in the material, were produced by applying focus elements to the workpiece, according to some embodiments.

By applying and/or introducing the focus elements 120 into the material 102, localized material modifications 138 are produced in each case which are located at the local positions $x_0$, $y_0$, $z_0$ of the corresponding focus elements 120 in the material 102 (FIG. 3). By suitably selecting processing parameters, such as the distances d between the focus elements 120, their intensities I, the feed rate orientated in the feed direction 126 and the laser parameters of the input laser beam 108, the material modifications 146 can be produced, for example, as type III modifications, which are associated with a spontaneous formation of cracks 137 in the material 102 of the workpiece 104. In particular, cracks 137 are formed between mutually adjacent material modifications 146.

Alternatively thereto, it is also possible by suitably selecting the processing parameters to produce the material modifications 146 as type I and/or type II modifications, which are accompanied by heat accumulation in the material 102 and/or by a change in a refractive index of the material 102. The producing of the material modifications 146 as type I and/or type II modifications is associated with a heat accumulation in the material 102 of the workpiece 104. In particular, to produce these material modifications 146, the distance d between the focus elements 120 is selected so small that this heat accumulation occurs when the focus elements are applied to material 102.

Figures 7A, 7B:
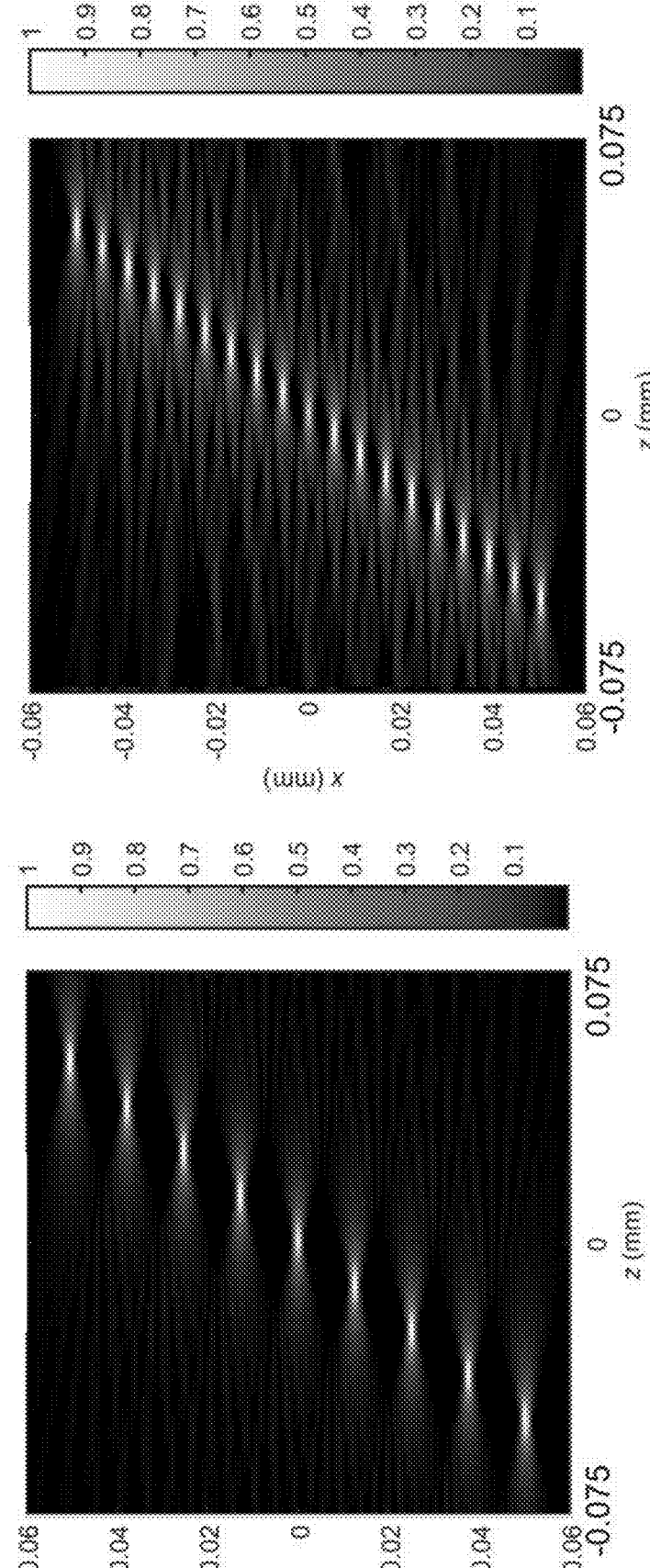
FIG. 7a shows a cross-sectional view of a simulated intensity distribution of focus elements for laser processing of the workpiece, wherein mutually adjacent focus elements are each spaced apart at a distance of approximately 17.5 $\mu$m, according to some embodiments.
FIG. 7b shows a cross-sectional view of a simulated intensity distribution of focus elements for laser processing of the workpiece, wherein mutually adjacent focus elements are each spaced apart at a distance of approximately 8.0 $\mu$m, according to some embodiments.

FIG. 7a shows a simulated intensity distribution of a plurality of focus elements 120, wherein the distance d is approximately 17.5 μm for these focus elements 120. In the grayscale value representation shown, lighter regions represent higher intensities.

FIG. 7b shows a simulated intensity distribution of a plurality of focus elements 120, wherein the distance d is approximately 8.0 μm.

The laser processing of the workpiece 104 by means of the device 100 functions as follows:

To carry out the laser processing, the focus elements 120 are applied to the material 102 of the workpiece 104 and the focus elements 120 are moved in the feed direction 126 relative to the workpiece 104 through its material 102.

In this case, the material 102 is a material transparent to a wavelength of laser beams from which the focus elements 120 are each formed, such as a glass material. In the example shown, the focus elements are formed by beam forming of the input laser beam 108.

Figures 8A, 8B:
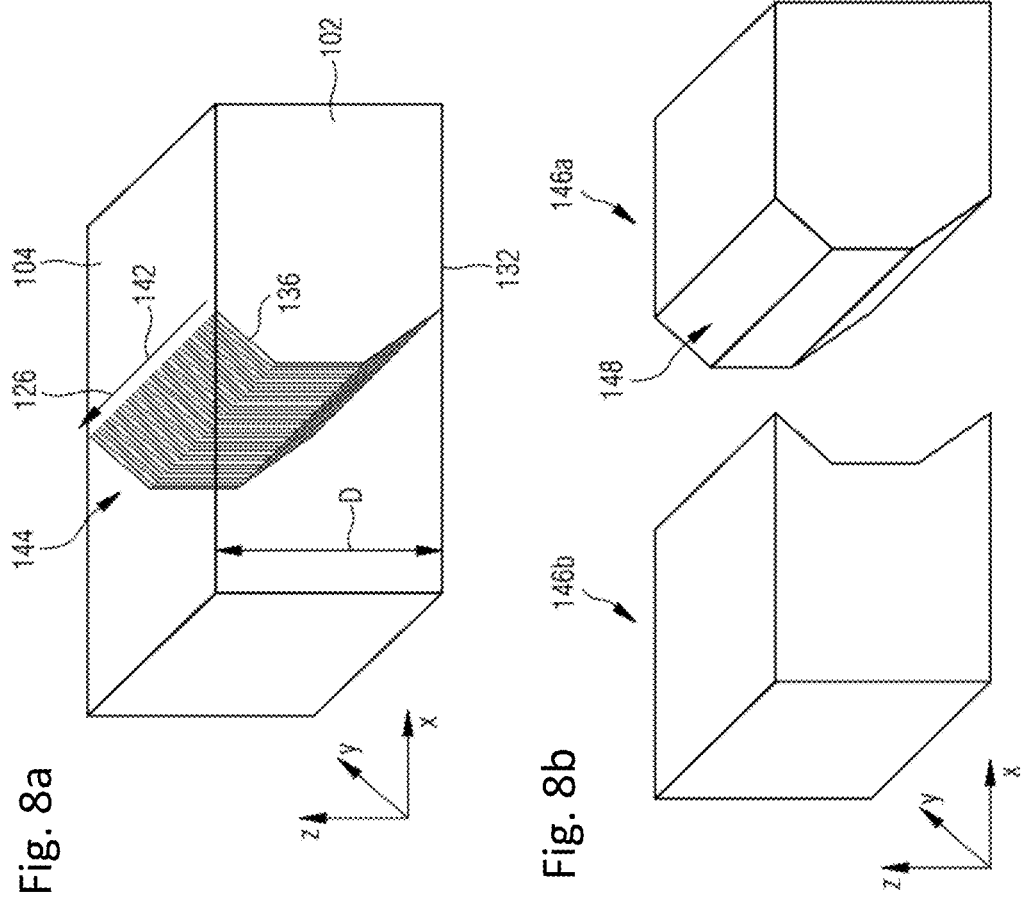
FIG. 8a shows a schematic perspective view of a workpiece having material modifications produced thereon, which extend along a processing line and/or processing surface, according to some embodiments.
FIG. 8b shows a schematic perspective view of two workpiece segments, which are formed by severing the workpiece according to FIG. 8a along the processing line and/or processing surface, according to some embodiments.

By applying the focus elements 120 to the material 102, material modifications 138 are produced in the material 102 which are arranged in a cross-section orientated perpendicular to the feed direction 126 along the processing line 136 (FIG. 8a). In the example shown in FIG. 8a, material modifications 138 are produced continuously over the entire thickness D of the material 102.

By relative movement of the focus elements 120 in relation to the material 102 along the trajectory 142, a processing surface 144 corresponding to the processing line 136 is formed, on which the material modifications 138 are arranged. This results in a planar formation and/or arrangement of the material modifications 146 along the processing surface 144.

The trajectory 142 can in principle have straight and curved portions. In the case of curved portions, the processing line 136 is in particular turned during the laser processing so that it always lies in a plane orientated perpendicular to the feed direction 126. This can be realized, for example, by corresponding rotation of the beam splitting element 106 or by relative rotation of the entire device 100 in relation to the workpiece 104.

A distance between adjacent material modifications 138 in the feed direction 126 can be defined, for example, by adjusting a pulse duration of the input laser beam 108 and/or by adjusting the feed rate.

The material modifications 146 produced along the processing line 136 result in particular in a reduction in a strength of the material 102. This allows the material 102 to be severed into two different workpiece segments 146a, 146b after the material modifications 146 have been produced on the processing surface 144, for example by exerting a mechanical force (FIG. 8b).

The workpiece segment 146a in the example shown is a yield segment having a severing surface 148, which has a shape corresponding to the shape of the processing line 136. In this case, the workpiece segment 154a is a residual workpiece segment and/or scrap segment.

For example, the material 102 of the workpiece 104 is quartz glass. For example, to produce the material modifications 138 as type-I and/or type II modifications, a laser beam from which the focus elements 120 are formed has a wavelength of 1030 nm and a pulse duration of 1 ps. Furthermore, a numerical aperture associated with the focusing optical unit 118 is then 0.4 and a pulse energy associated with a single focus element 120 is then 50 to 200 nJ.

To produce the material modifications 138 as type III modifications, the pulse energy associated with a single focus element 120 is 500 to 2000 nJ, with otherwise identical parameters.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

α Angle of attack
d Distance
$d_0$ Distance
$d_{eff}$ Effective distance
$d_{x,eff}$ Effective distance component
$d_{z,eff}$ Effective distance component D Thickness
I Intensity
$x_0$ Position in the x-direction
$y_0$ Position in the y-direction
$z_0$ Position in the z-direction
100 Device
102 Material
104 Workpiece
106 Beam splitting element
108 Input laser beam
110 Laser beam source
112 Beam cross-section
114 Wavefront
116 Sub-beams
116a Sub-beam
116b Sub-beam
118 Focusing optical unit
120 Focus element
120a, b Focus element
121 Focus distribution
122 Beam forming apparatus
124 Beam propagation direction
126 Feed direction
127 Feed apparatus
130 First outer side
132 Second outer side
134 Thickness direction
136 Processing line
137 Crack
138 Material modification
139 Projection plane
140 Portion
140a First portion
140b Second portion
140c Third portion
141 Plane
141a First plane
141b Second plane
142 Trajectory
143 Gap
144 Processing surface
146a Workpiece segment
146b Workpiece segment
148 Severing surface

The invention claimed is:

1. A method for laser processing of a workpiece which has a transparent material, the method comprising:

dividing an input laser beam into a plurality of sub-beams by using a beam splitter, focusing and directing the plurality of sub-beams coupled out of the beam splitter into the workpiece, wherein the plurality of sub-beams are focused to multiple focus spots inside the workpiece for producing modifications in the material of the workpiece, wherein the workpiece has a thickness along z-axis, moving the workpiece and/or the plurality of sub-beams relative to each other in a feed direction that is parallel to y-axis orthogonal to the z-axis, wherein a first sub-quantity plurality of the focus spots lies in a first plane, and a second plurality of the focus spots lies in a second plane, the first plurality and the second plurality of the focus spots being present simultaneously, the first plane and the second plane being perpendicular to the feed direction and spaced apart from each other in the feed direction, and wherein by moving the workpiece and/or the plurality of sub-beams relative to each other in the feed direction, the modifications are produced in the material along a processing surface.

2. The method according to claim 1, wherein the focus spots are positioned such that, when the focus spots are viewed in a projection plane orientated perpendicular to the y-axis, at least a sub-quantity of the focus spots associated with the first plane and the focus spots associated with the second plane is positioned at different spatial positions in the projection plane.

3. The method according to claim 1, wherein the focus spots are positioned such that, when the focus spots are viewed in a projection plane orientated perpendicular to the y-axis, at least a sub-quantity of the focus spots associated with the first plane and the focus spots associated with the second plane is positioned in the projection plane along a processing line, wherein, by moving the workpiece and/or the plurality of sub-beams relative to each other, the modifications are produced in the material along the processing line.

4. The method according to claim 3, wherein, by moving the workpiece and/or the plurality of sub-beams relative to each other, the modifications are produced in the material of the workpiece along the processing surface corresponding to the processing line, wherein the modifications are arranged in a cross-section orientated perpendicular to the y-axis, through the processing surface along the processing line.

5. The method according to claim 3, wherein adjacent focus spots arranged along the processing line have an effective distance of at least 2 μm and/or at most 200 μm in the projection plane.

6. The method according to claim 3, wherein an effective distance of adjacent focus spots along the processing line in the projection plane and/or an intensity of the focus spots is selected such that the modifications formed in the material enable a severing of the material.

7. The method according to claim 3, wherein at least a sub-quantity of adjacent focus spots along the processing line is spaced apart in the projection plane with approximately a same effective distance from one another.

8. The method according to claim 3, wherein at least a sub-quantity of adjacent focus spots along the processing line is spaced apart at an effective distance, wherein the effective distance has a first non-zero effective distance component along the z-axis, and/or has a second non-zero effective distance component along x-axis orthogonal to the z-axis.

9. The method according to claim 3, wherein an angle of attack between the processing line and an outer side of the workpiece, through which the plurality of sub-beams are coupled into the material of the workpiece, is at least 1° and/or at most 90°, at least in some portions.

10. The method according to claim 1, wherein the focus spots are positioned such that, when the focus spots are viewed in a projection plane orientated perpendicular to the y-axis, gaps are formed between adjacent focus spots associated with the first plane, wherein the second plurality of focus spots associated with the second plane is positioned in the gaps.

11. The method according to claim 1, wherein a first distance between adjacent focus spots associated with the first plane is at least 3 μm and/or at most 70 μm, and/or a second distance between adjacent focus spots associated with the second plane is at least 3 μm and/or at most 70 μm.

12. The method according to claim 1, wherein the dividing the input laser beam by using the beam splitter comprises phase imprinting on a beam cross-section of the input laser beam.

13. The method according to claim 1, wherein the modifications in the material of the workpiece are accompanied by a crack formation of the material, and/or wherein the modifications are type III material modifications.

14. The method according to claim 1, wherein the modifications in the material of the workpiece are accompanied by a change in a refractive index of the material, and/or the modifications are type I material modifications and/or type II material modifications.

15. A device for laser processing of a workpiece having a transparent material, the device comprising:

a beam splitter for dividing an input laser beam into a plurality of sub-beams, a focusing optical unit for focusing and directing the plurality of sub-beams coupled out of the beam splitter into the workpiece, wherein the plurality of sub-beams are focused to multiple focus spots inside the workpiece for producing modifications in the material of the workpiece, wherein the workpiece has a thickness along z-axis, and a feed apparatus for moving the workpiece and/or the plurality of sub-beams relative to each other in a feed direction that is parallel to y-axis orthogonal to the z-axis, wherein the beam splitter and the focusing optical unit are configured so that the focus spots are formed in the material of the workpiece in such a way that a first plurality of the focus spots is arranged in a first plane, and a second plurality of the focus spots is arranged in a second plane, the first plurality and the second plurality of the focus spots being present simultaneously, the first plane and the second plane being perpendicular to the feed direction and spaced apart from each other in the feed direction, and wherein by moving the workpiece and/or the plurality of sub-beams relative to each other in the feed direction, the modifications are produced in the material along a processing surface.

* * * * *